INVENTORS
Robert M. Tuck,
James T. Mooney, Jr.
& Marion D. Smith

ATTORNEY

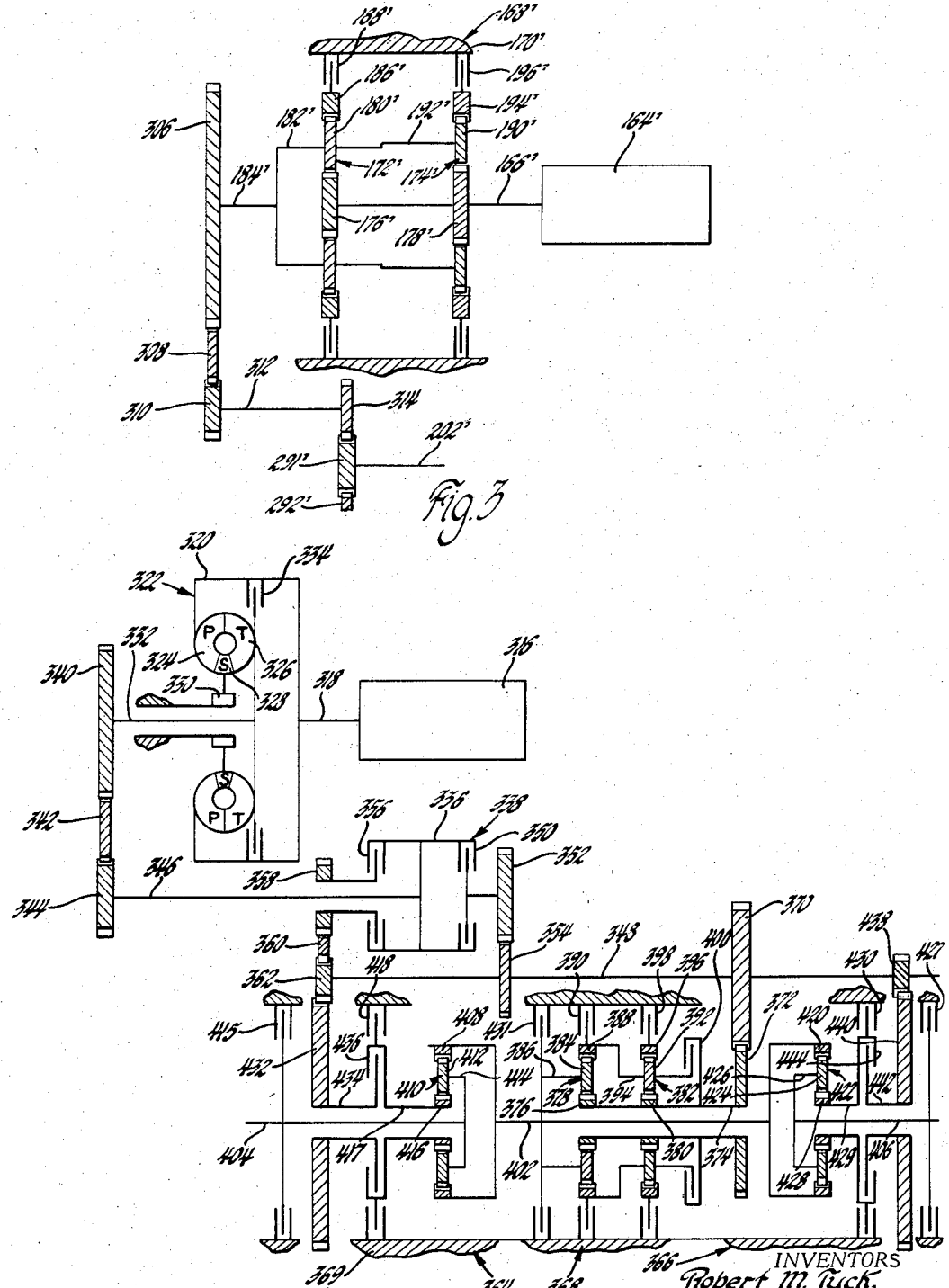

INVENTORS
Robert M. Tuck,
James J. Mooney, Jr.
& Marion D. Smith

ATTORNEY

INVENTORS
Robert M. Tuck,
James J. Mooney, Jr. &
Marion D. Smith

ATTORNEY

United States Patent Office 3,377,885
Patented Apr. 16, 1968

3,377,885
TRANSMISSION
Robert M. Tuck, James J. Mooney, Jr., and Marion D. Smith, Indianapolis, Ind., assignors to General Motors Corporation, Detroit, Mich., a corporation of Delaware
Filed June 28, 1965, Ser. No. 467,556
9 Claims. (Cl. 74—720.5)

ABSTRACT OF THE DISCLOSURE

A cross-drive transmission for a track-laying vehicle having a multispeed ratio drive unit driven by the transmission input, and a pair of differential drive units for driving the transmission outputs. Like input members of the differential drive units are connected and may be either braked or driven through the multispeed ratio drive unit. A second pair of like members of the differential drive units are separately and selectively connected to be driven by the transmission input and the transmission is operable to provide a plurality of vehicle propelling drives, drive-brake steering, geared steering and pivot steering. A forward-reverse drive unit provides the transmission with full reversing capabilities.

---

Figure 1:
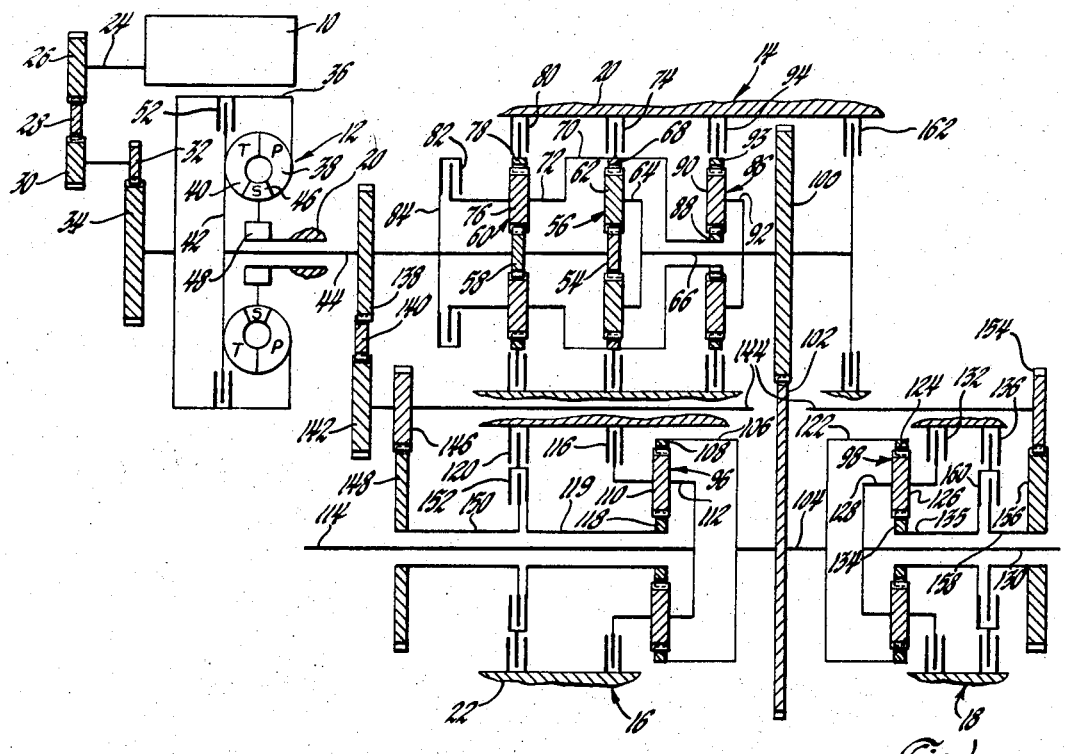

This invention relates to power trains and more particularly to cross-drive transmissions providing multiple-speed range and multiple-steering system operation.

In heavy duty vehicles such as ordnance vehicles and commercial earth-moving vehicles of the track-laying type, it is advantageous to have a cross-drive transmission capable of providing multiple-speed range operation for matching the prime mover to the vehicle to efficiently handle power requirements and also capable of providing different steering systems for different degrees of turn and for varying road conditions to maintain a high degree of maneuverability without loss of vehicle response. In addition, there are advantages to be gained by providing such a transmission in a minimum space package having minimum weight and simple power path constructions, all this without sacrificing power train reliability by overstressing or overspeeding the load carrying members.

This invention provides all of the above advantages and is illustrated in one preferred embodiment in a power train having a prime mover arranged transverse of a vehicle and driving a transversely arranged hydrodynamic torque converter whose converter output is operatively connected to selectively deliver power through three power input paths to a cross-drive transmission unit also arranged transverse of the vehicle. In the cross-drive transmission unit, one power input path is to a three-speed forward, one-speed reverse range planetary gear unit and the remaining two power input paths are through a power delivery gear train to steer planetary gear units. The steer units, which are located at the outboard ends of the transmission unit, are conditionable to act as torque multipliers with single input from the converter output and also as power combiners and speed differentials with dual input from the converter output and the range unit output for completing the power drive to the transmission unit's separate and axially aligned output shafts. The output shafts would in turn be connected to drive the vehicle's propelling devices which, in the case of track-laying vehicles, would be through final reduction drives and track sprockets to endless tracks.

In a first or lowest forward drive range all power input for the transmission unit is delivered from the converter output through engaged drive clutches to drive the steer units' sun gears forward. The steer units' ring gears, which may be selectively grounded by a single low low brake or permitted to rotate, are held and both the steer units act as low gear sets to provide maximum torque at the transmission output shafts only and thereby reduce the torque load on the remainder of the power train. During first forward drive range operation, a steer is accomplished by releasing one of the steer sun gears by disengaging its drive clutch and braking this released steer sun gear with a steering brake. Since both the steer sun gear and ring gear are braked on one outboard side and only the steer ring gear on the other outboard side, there is provided a clutch-brake or drive-brake steer whose turn radius is a minimum when the braked steer sun gear is grounded and is increased by slipping the steering brake under load.

Three higher forward drive ranges are obtained by selectively driving the two steer ring gears forward at three different speeds through the range unit while the steer sun gears continue to be driven forward with their drive clutches engaged. The steer units then act as power combining and speed differential units receiving power from the range unit output through the steer ring gears and from converter output through the steer sun gears.

A steer is accomplished in these higher forward drive ranges by downshifting one of the steer units by disengaging the drive clutch in the power path to one of the steer sun gears and engaging the steer brake to brake this released steer sun gear. This also provides a regenerative geared steer because the steer ring gears are connected to transmit power from one to the other. Under these conditions the radius of turn will depend on the relative speed of the driving steer sun and ring gears in each range of operation, varying from moderate geared turns in the highest speed ranges for minimum steer clutch energy to short geared turns in the lower speed range operations for maximum maneuverability. This type of steer is best described as geared steering in that it provides one speed ratio drive to one of the cross-drive output shafts and a different speed ratio drive to the other output shaft and is advantageous for long periods of steering as required to move a tracked vehicle through a constant radius turn since constant slipping of a brake, such as occurs in drive-brake steering, may cause overheating and excessive wear. For larger constant radius turns in geared steering, the engagement device establishing the lowest speed ratio drive may be permitted to slip; however, such slippage is much less than the slippage required to maintain the same constant turning radius through use of the drive-brake steering system.

In neutral, the steer sun gears continue to be powered by the converter for forward rotation but the steer ring gears are released and permitted to turn backwards under no load. Then, when one of the steer sun gears is released and held by its steer brake, the opposite steer sun gear drives the output shaft on its side forward and drives the other output shaft backwards through the connected steer ring gears to effect a pivot steer. The pivot steering system is advantageous in that it provides increased mud and water vehicle mobility in addition to being useful for dry land operation.

For reverse drive operation, the steer sun gears continue to be driven forward but the steer ring gears are driven backward by the range unit which is then conditioned for reverse drive and their combined action drives the output shafts backward. A geared steer is accomplished in reverse by downshifting one of the steer units by releasing one of the steer sun gears and then grounding this released steer sun gear by engaging its steer brake to produce a very tight geared turn which provides increased mobility particularly for amphibious operation.

The cross-drive transmission, according to this invention, may have the range unit between the steer units with all units axially aligned in a compact single barrel fashion or may be arranged in a compact double barrel fashion with the range unit and the axially aligned steer units arranged side by side. In addition, the embodiment of the cross-drive transmission briefly described above and which is employed in a power train having a hydrodynamic torque converter which is normally used with prime movers such as piston engines, may also be adapted for use with prime movers such as gas turbines and may also have an extended range of operation in reverse.

An object of this invention is to provide in a power train, a cross-drive transmission having improved gear drive arrangements operable to provide drive-brake steering, geared steering and pivot steering.

Another object of this invention is to provide a cross-drive transmission operable to provide multiple drive range operation and multiple steering control through improved power path construction.

Another object of this invention is to provide a cross-drive transmission having divided power input and plural power combining outputs with one power input path through a multiple speed ratio gear unit and the remaining power paths through power trains having selectively operable drive establishing devices.

Another object of this invention is to provide a cross-drive transmission having an input with plural power paths to each of a pair of outputs, one power path being common to each output having a selectively conditionable multiple speed ratio drive unit for power delivery to both outputs for forward and reverse drive and the remaining power paths being selectively conditionable to deliver power from the input to both outputs for forward and reverse drive and also to deliver power to only one of the outputs for steering.

Another object of this invention is to provide a cross-drive transmission having an input and a pair of outputs with a multiple speed ratio drive unit connected to be driven by the input and a differential drive unit for driving each output connected to be driven solely by the input and also by both the input and the multiple speed ratio drive unit to provide torque multiplying drive for each output and also torque combining and torque multiplying drive for each output.

Another object of this invention is to provide a cross-drive transmission having an input and a pair of outputs with a multiple speed ratio drive unit connected to be driven by the input and a differential drive unit for driving each output having plural input members connected to be driven separately by the multiple speed ratio drive unit and the input to provide drive to the outputs in a plurality of speed ranges for straight-forward and reverse drive and to provide a plurality of different types of steering.

Another object of this invention is to provide a cross-drive transmission having an input and a pair of outputs, the input being connected to provide split torque drive by one power path through a multiple speed range planetary gear unit to a pair of steer planetary gear units connected to drive the outputs and via a pair of power paths through selectively operable drive clutches to the steer units, the steer units being conditionable to provide in a low speed range, torque multiplication and a low reduction drive to the outputs with divided power input via the pair of power paths and to combine and multiply the torque from the multispeed range unit and the input to provide combined power drive in three higher speed ranges to the outputs, the steer units providing, on selective conditioning, different types of steering systems in the speed ranges including drive-brake steering, regenerative geared steering through a power transfer path between the steer units and pivot steering.

Another object of this invention is to provide a cross-drive transmission having an input and a pair of outputs, the input being connected to provide split torque drive by one power path through a multiple speed range planetary gear unit to a pair of steer planetary gear units connected to drive the outputs and via a pair of power paths provided by a differential drive to the steer units, the steer units being conditionable to provide in a low speed range, torque multiplication and a low reduction drive to the outputs with power input via the differential drive pair of power paths and to combine and multiply the torque from the multispeed range unit and the differential drive to provide combined power drive in three higher speed ranges to the outputs, the steer units providing on selective conditioning, different types of steering systems in the speed ranges including brake-differential steering, differential steering and pivot steering.

These and other objects of the invention will be more apparent from the following description and drawing of the preferred embodiments of the invention in which:

FIGURE 1 diagrammatically shows one embodiment of a cross-drive transmission according to this invention.

Figure 2:
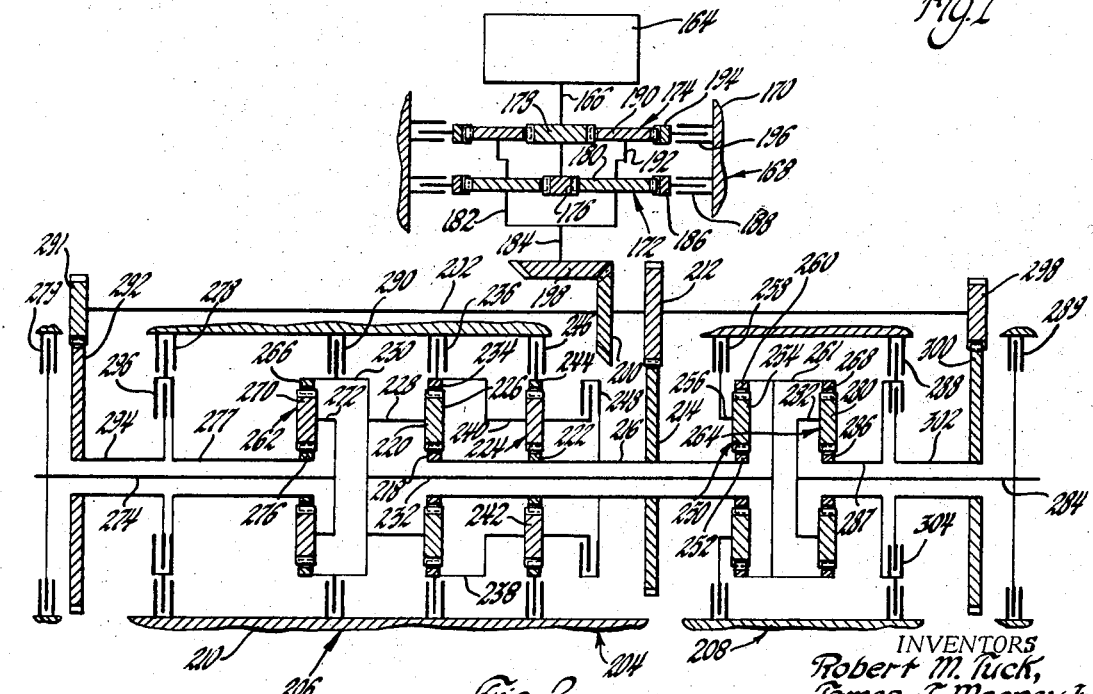

FIGURE 2 diagrammatically shows another embodiment of a crossdrive transmission according to this invention.

FIGURE 3 diagrammatically shows elements of the FIGURE 2 embodiment and another way of arranging the input drive.

FIGURE 4 diagrammatically shows another embodiment of a cross-drive transmission according to this invention.

Figure 5:
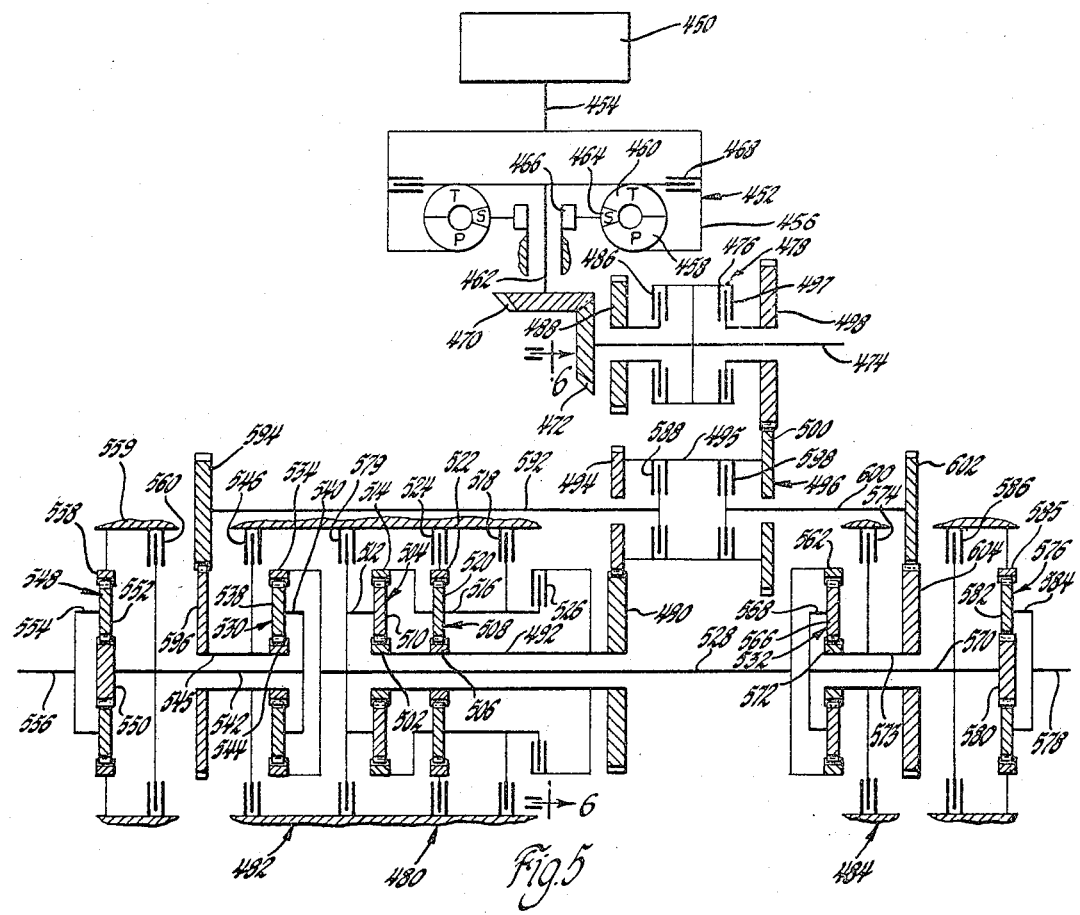

FIGURE 5 diagrammatically shows another embodiment of a cross-drive transmission according to this invention.

Figure 6:
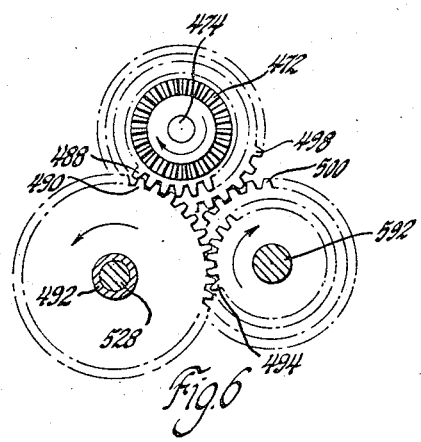

FIGURE 6 is a view taken substantially on the line 6—6 in FIGURE 5.

Figure 7:
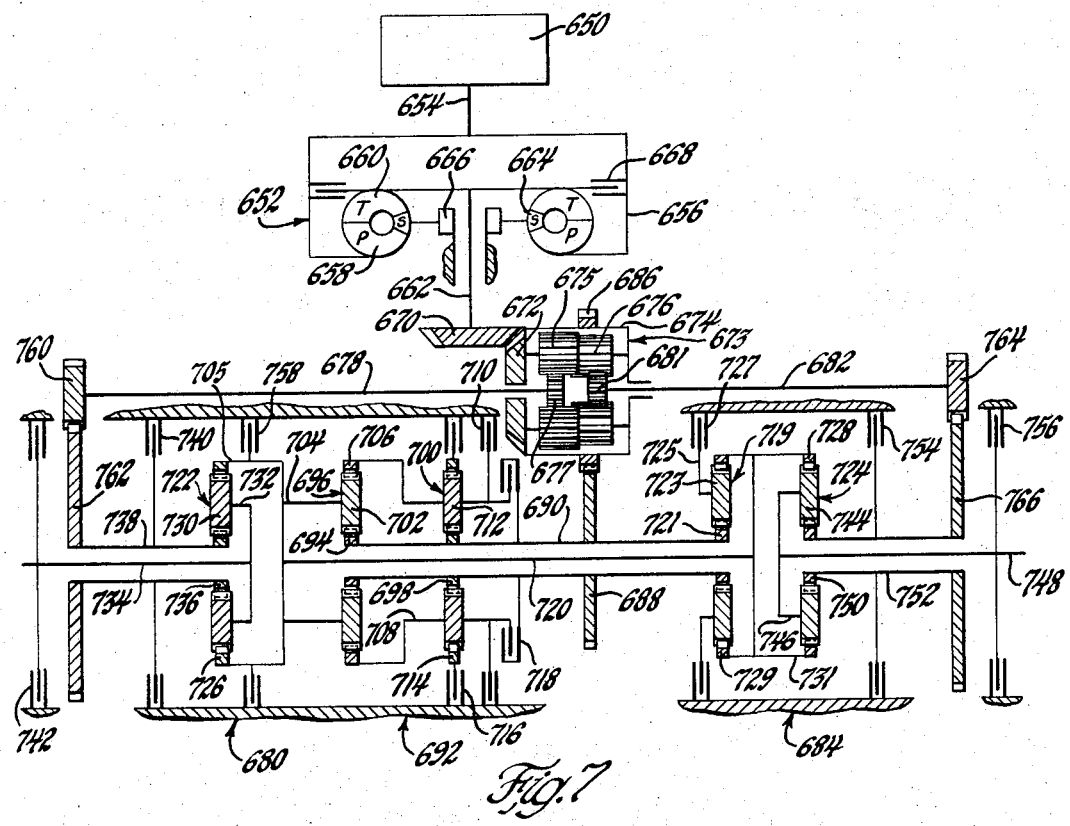

FIGURE 7 diagrammatically shows another embodiment of a cross-drive transmission according to this invention.

The invention is illustrated in one embodiment in FIGURE 1 in a vehicle power train. This power train has a prime mover 10, a hydrodynamic torque converter 12 and our cross-drive transmission unit comprising a three-speed forward, one-speed reverse range unit 14, a left steer unit 16 and a right steer unit 18, all these components having their longitudinal central axes arranged to be mounted transverse of the vehicle to be driven. A housing 20 houses the converter 12 and range unit 14 and a housing 22 houses both the steer units 16 and 18. These housings define what may be best described as a double barrel configuration for the cross-drive transmission and may be of one casting or made separately and rigidly joined together.

Describing now these components and their power train connections in detail, prime mover 10 has its output shaft 24 connected by a speed reduction and direction reversing reduction gear train comprising spur gears 26, 28, 30, 32 and 34 and by a converter housing 36 to the pump blading 38 of torque converter 12. In the gear train, shaft 24 is connected to drive gear 26 which meshes with reverse idler gear 28 and gear 28 in turn meshes with gear 30. Gear 30 is shaft connected to drive gear 32 which meshes with gear 34, the latter gear being connected directly to the rotatable converter housing 36.

The pump blading 38 exits to turbine blading 40 which is connected by a hub 42 to a turbine or converter output shaft 44. Fluid is circulated toroidally in the torque converter and, as it leaves the turbine blading 40, it is redirected to the pump blading 38 by stator blading 46 which is connected to a one-way brake 48 grounded to the transmission housing 20, the torque converter thus providing torque multiplication in a conventional manner.

A converter lockup clutch 52, when actuated by any suitable control means, is effective to prevent relative rotation between the converter housing 36 and the hub 42 to provide a direct mechanical drive through the converter. Thus, there is also provided a mechanical drive between the prime mover output shaft 24 and the converter output shaft 44.

The converter output shaft 44 provides input to the range unit 14 and also to both steer units 16 and 18 of the cross-drive transmission. For input to the range unit 14, the converter output shaft 44 is connected to drive the sun gear 54 of a low planetary gear set 56 and the sun gear 58 of an intermediate planetary gear set 60. The sun gear 54 meshes with a plurality of planetary pinions 62 journaled on an output planet carrier 64. Output carrier 64 is drivingly connected to shaft 66 which is the output for range unit 14. A ring gear 68 meshes with pinions 62 and is connected by a drum 70 to the planet carrier 72 of the intermediate gear set 60 and to a low brake 74. Low brake 74, when engaged, holds ring gear 68 to provide a low ratio drive which drives the output shaft 66 in the same direction as converter output shaft 44 and at a reduced speed. The sun gear 58 meshes with a plurality of planetary pinions 76 journaled on the carrier 72. A ring gear 78 meshes with pinions 76 and is connected to an intermediate brake 80 which, when engaged, holds ring gear 78 to provide an intermediate ratio drive to output shaft 66 in which the ring gear 68 of the low gear set 56 is driven by intermediate carrier 72 in the same direction as sun gear 54 but at a slower speed. High ratio drive in range unit 14 is provided by engagement of a high clutch 82 to connect the converter output shaft 44 via a connected hub 84 to the intermediate carrier 72, thus locking up low gear set 56 to provide a direct drive between the converter output shaft 44 and output shaft 66.

Reverse drive is provided in range unit 14 by the reverse planetary gear set 86 which has its annular sun gear 88 connected to be driven by drum 70 and connected ring gear 68 of the low gear set 56. Sun gear 88 meshes with a plurality of planetary pinions 90 journaled on a planet carrier 92 connected to drive the output shaft 66 which shaft extends through sun gear 88. A ring gear 93 meshes with pinions 90 and is connected to a reverse brake 94 which, when engaged, holds the ring gear 93. With ring gear 93 held, the sun gear 88 is driven in reverse by the low gear set 56 to in turn drive the planet carrier 92 and connected output shaft 66 in a direction opposite that of converter output shaft 44 and at a reduced speed.

The output shaft 66 of range unit 14 provides one input through a divided power path to both the steer units 16 and 18 which have matched ratio planetary gear sets 96 and 98, respectively, output shaft 66 being connected to drive a spur gear 100 which meshes with a spur gear 102 drive connected to a cross shaft 104 rotatably supported intermediate the steer gear sets 96 and 98. Cross shaft 104 is input for both steer units and is driven by the meshing gears 100 and 102 in a direction opposite that of the range unit output shaft 66. In the low, intermediate and high ratio drives of range unit 14, cross shaft 104 is thus driven in a direction opposite shaft 66 which direction will be described as the forward direction and in the reverse drive of range unit 14, cross shaft 104 will thus be driven in the reverse direction.

In the left steer gear set 96, the cross shaft 104 is connected at its left end to a drum 106 which is drive connected to the steer ring gear 108. Ring gear 108 meshes with a plurality of pinions 110 which are journaled on a left output planet carrier 112 which is connected to drive shaft 114 which is the left output for the cross-drive transmission, carrier 112 also being connected to a left vehicle brake 116 which, when engaged, brakes the left output shaft 114. An annular sun gear 118, through which shaft 114 extends, meshes with pinions 110 and is connected by a sleeve shaft 119 surrounding shaft 114 to a steer brake 120 which, when engaged, holds the sun gear 118 so that when ring gear 108 is being driven, carrier 112 and connected output shaft 114 are driven in the same direction and at a reduced speed. Output shaft 114 would in turn be connected to drive one of the vehicle's propelling devices which, in the case of track-laying vehicles, would be through a vehicle-mounted final speed reduction drive and a track sprocket to the vehicle's left endless track.

The right end of intermediate shaft 104 is connected in similar manner in the right steer unit 18 by a drum 122 to the ring gear 124 of the right steer gear set 98. Ring gear 124 meshes with a plurality of planetary pinions 126 journaled on the right output planet carrier 128 which is connected to drive shaft 130 which shaft is the right output for the cross-drive transmission, carrier 128 also being connected to a right vehicle brake 132 which, when engaged, brakes the right output shaft 130. An annular sun gear 134 through which shaft 130 extends meshes with pinions 126 and is connected by a sleeve shaft 135 surrounding shaft 130 to a right steer brake 136 which, when engaged, holds the sun gear 134 so that when ring gear 124 is being driven, carrier 128 and connected right output shaft 130 are driven in the same direction and at a reduced speed to drive the vehicle's right endless track through a vehicle-mounted final speed reduction drive and a track sprocket.

Describing now the power path from the converter output shaft 44 directly to the steer units 16 and 18, which is a divided power path providing separate and selectable equal speed ratio drives to both steer units, the converter output shaft 44 is connected to drive a spur gear 138 which meshes with a reverse idler spur gear 140. Gear 140 in turn meshes with a spur gear 142 connected to drive a power delivery cross shaft 144 serving both steer units. The cross shaft 144 extends longitudinally the length of steer units 16 and 18 and at its left end is connected to drive a spur gear 146 which meshes with an annular spur gear 148 surrounding shaft 114. Gear 148 is drive connected to a sleeve shaft 150 also surrounding the left output shaft 114. A left drive clutch 152, when engaged, connects sleeve shaft 150 to sleeve shaft 119 to drive sun gear 118 in the opposite direction to the converter output shaft 44 to provide another forward input to the left steer gear set 96 in addition to the input through ring gear 108. Shaft 144 at its right end, in like manner, is drive connected to a spur gear 154 which meshes with an annular spur gear 156 surrounding shaft 130. Gear 156 is connected to drive a sleeve shaft 158 also surrounding the right output shaft 130. A right drive clutch 160, when engaged, connects sleeve shaft 158 to sleeve shaft 135 to drive sun gear 134 in the opposite direction to the converter output shaft 44 to provide another forward input for this gear set in addition to the input provided through ring gear 124. The spur gear trains connecting shaft 144 to the steer sun gears 118 and 134 have equal speed ratios.

The range of usefulness of steer units 16 and 18 and thus of the cross-drive transmission is extended by the provision of a low low brake 162 located in range unit 14 which, when engaged, holds the range unit output shaft 66. This prevents rotation of meshing gears 100 and 102 and thus grounds the connected ring gears 108 and 124 of the steer gear sets 96 and 98, respectively, to provide a low low ratio drive to the output shafts 114 and 130 when the steer sun gears 118 and 134 are driven forwardly by the converter output shaft 44. This drive will be more clearly understood from the cross-drive transmission operation described below.

The various brakes and clutches or friction engaging devices employed in this power train are conventional and may be actuated in any known way, e.g. electrically, hydraulically, pneumatically or by some mechanical provision and in a certain sequence. The preferred sequence of operation is described in the following illustrative operational summary.

The cross-drive transmission of FIGURE 1 may be operated to provide four forward speeds, one reverse speed, drive or clutch brake steering, geared steering and pivot steering. In the first or low low forward drive range, which is considered the lowest drive range and provides the greatest torque multiplication, the low low brake 162 and the left and right drive clutches 152 and 160 are engaged and all other drive establishing devices are disengaged. Under these conditions, the range unit 14 is thus conditioned so as not to transmit power to its output shaft 66 which is being held by the engaged low low brake 162. Converter output is delivered through the engaged drive clutches 152 and 160 to drive the steer sun gears 118 and 134 forwardly at the same speed. Since the steer ring gears 108 and 124 are both held by low low brake 162, the steer gear sets 96 and 98 act as torque multiplying and low ratio gear sets for the first forward drive range and provide maximum torque at the output shafts 114 and 130 only, thus reducing the torque load on the remainder of the power train.

In this low low forward drive range, drive or clutch-brake steering is available by releasing one of the steer sun gears 118 and 134 by disengaging its associated drive clutch and at the same time grounding the released sun gear with its associated steer brake. For example, for what will be described as a right drive-brake steer, the low low brake 162 and left drive clutch 152 remain engaged for low low forward drive to the left output shaft 114 while the right drive clutch 160 is disengaged and the right steer brake 136 is engaged to lock up the right steer gear set 98 to brake the right output shaft 130. For a left-drive brake steer, the left drive clutch 152 is disengaged and the left steer brake 120 is engaged while the low low brake 162 and right drive clutch 160 remain engaged. In addition, the steer brake, which brake is engaged during drive-brake steering, can be slipped through any suitable control to vary the radius of turn from straight ahead to one cross-drive output shaft held to produce what may best be described as a skid turn.

The three higher forward drive ranges are provided by split torque drive to the steer units which split torque drive apportions the torque between the power paths to reduce their torque loads. The steer sun gears 118 and 134 of the steer gear sets continue to be driven forwardly through the divided power path by the converter output shaft 44 through engagement of the left and right drive clutches 152 and 160, respectively, while at the same time the steer ring gears 108 and 124 of the steer gear sets are driven forwardly at different speeds through their common input power path which includes the range unit 14. Under these conditions, the steer gear sets thus act as power combiners and speed differentials receiving power from the range unit through their steer ring gears and from the converter output through their steer sun gears to again provide maximum torque at the output shafts only to reduce the torque load on the remainder of the power train.

For example, in the next highest forward drive range, which will be designated as the second or low forward drive range, the left and right drive clutches 152 and 160 remain engaged while the low low brake 162 is disengaged and the low brake 74 of range unit 14 is engaged. Thus, the steer sun gears 118 and 134 continue to be driven forwardly by the converter output shaft 44 and the steer ring gears 108 and 124 are also driven forwardly by the range unit low ratio drive. The forward drive contributions of the steer sun and ring gears are then combined by the steer gear sets to produce the low forward drive. The third or intermediate forward drive range is obtained by leaving the left and right drive clutches 152 and 160 engaged, releasing the low brake 74 and engaging the intermediate brake 80 to provide a higher speed drive to the steer ring gears 108 and 124. The fourth or high forward drive range is provided by leaving the left and right drive clutches 152 and 160 engaged, releasing the intermediate brake 80 and engaging the high clutch 82 to provide the range unit direct drive for driving the steer ring gears 108 and 124 forwardly at the highest speed ratio available.

In the three highest forward drive ranges, a geared steer is available by releasing the drive clutch serving one of the steer gear sets and applying the steer brake of this same steer gear set to eliminate the forward drive contribution of its steer sun gear to provide a downshift. For example, in the low forward drive range, a right-low geared steer is accomplished by disengaging the right drive clutch 160 and engaging the right steer brake 136. This leaves the low forward drive to the left output shaft 114, while the right steer gear set is downshifted by the right steer sun gear 134 now being held for reaction by the engaged right steer brake 136 as the right steer ring gear 124, like left steer ring gear 108, continues to be driven forwardly by the low ratio drive range of range unit 14. Since the forward drive contribution of the steer sun gear 134 is no longer available and only the forward drive of the right steer ring gear 134 remains available, the right output carrier 128 slows down to thus produce this downshift. For left-low geared steer, the right steer gear set 98 remains conditioned for the low forward drive to the right output shaft 130 while the left drive clutch 152 is disengaged and the left steer brake 120 is engaged to downshift the left steer gear set 96.

A right-intermediate geared steer is accomplished in the intermediate drive range by disengaging the right drive clutch 160 and engaging the right steer brake 136 to downshift the right steer gear set. Alternatively, a left-intermediate geared steer is accomplished by downshifting the left steer gear set through release of the left drive clutch 152 accompanied by engagement of the left steer brake 120.

For geared steer in the high drive range, the right drive clutch 160 is released and the right steer brake 136 is engaged to downshift the right steer gear set while the left drive clutch 152 remains engaged to provide a right high geared steer. Alternatively, the left drive clutch 152 is released and the left steer brake 120 is engaged to downshift the left steer gear set while the right drive clutch 160 remains engaged to provide a left high geared steer.

In geared steer in the three highest forward drive ranges, added advantage is gained through regenerative effect since the steer ring gears 108 and 124, which are connected by cross shaft 104, can transmit power from one steer gear set to the other and thus to their respective output shafts. In addition, there is obtained a large degree of flexibility in controlling the radius of turn in geared steer since turn radius will depend on the relative speed of the steer sun and ring gears of the steer gear sets and can vary from moderate gear turns in the higher speed operating ranges for minimum steer brake energy to sharp gear turns in the lower speed operating ranges for maximum maneuverability. While geared steer is the preferred type of steer in the three highest drive ranges, it will be recognized that drive or clutch-brake steering is also available, should that be desired to spin out the vehicle, for example, simply by releasing one of the steer sun gears for free wheeling by disengaging its associated drive clutch and engaging the vehicle brake to hold the output shaft on this same steer gear set side while the opposite steer gear set remains conditioned for either low, intermediate or high forward drive to its connected output shaft.

In neutral, all drives through the range unit 14 are disengaged and the steer ring gears 108 and 124 are free to rotate. The drive clutches 152 and 160 are engaged so that the steer sun gears 118 and 134 continue to be powered forwardly and with the steer ring gears released, they therefore turn backwards under no load. Then, when one of the steer sun gears is released and then held by engagement of its steer brake, the opposite steer sun gear, which is not held but driven, drives its associated output shaft forward. This driven steer sun gear also drives the opposite output shaft, which output shaft is on the side of the engaged steer brake, backwards through the power path provided by the connected steer ring gears. This operation provides a pivot steer. For example, for a right pivot steer and with all drive establishing devices in the range unit 14 disengaged for neutral, the previously engaged right drive clutch 160 is released and the right steer brake 136 is engaged. The left drive clutch 152 remains engaged to drive the left output shaft 114 forwardly through the left steer gear set 96 and to drive the right output shaft 130 in the reverse direction and at the same speed through the steer ring gear connected right steer gear set 98. Similarly, for a left pivot steer, the left drive clutch 152 is released and the left steer brake 120 is engaged while the right drive clutch 160 remains engaged to drive the right output shaft 130 forwardly and the left output shaft 114 in the reverse direction and at the same speed.

The reverse drive range also has split torque drive and is provided by driving the steer gun gears forwardly by engaging the drive clutches 152 and 160 and engaging the reverse brake 94 in range unit 14 to drive the steer ring gears in reverse. This combined sun and ring gear action drives the output shafts 114 and 130 in reverse and again maximum torque is at the output shafts only. Geared steering is available in reverse to provide a right and very tight geared turn by disengaging the left drive clutch 152 and engaging the left steer brake 120 to now hold the left steer sun gear 118 for reaction. This provides an upshift in reverse in the left steer gear set to speed up its output carrier and connected left output shaft 114. Similarly, for a left geared turn in reverse, the right drive clutch 160 is released and the right steer brake 136 is engaged to upshift in reverse the right steer gear set, thus speeding up its output carrier and connected right output shaft 130 in reverse.

Thus, a geared steer in reverse is accomplished by applying the steer brake on the side opposite the direction of turn to ground the associated steer sun gear and eliminate its forward rotation which forward rotation in straight reverse is utilized to partially offset the reverse rotation of the steer ring gears to provide a lower speed straight reverse drive than would be available if the steer sun gears were both grounded. While geared steer is the preferred type of steer in reverse, it will be recognized that drive-brake steering is also available simply by releasing one of the steer sun gears for free wheeling by disengaging its associated drive clutch and engaging the vehicle brake to hold the output shaft on this same side while the opposite steer gear set remains conditioned for the reverse drive.

The preferred sequential operation of the various clutches and brakes to provide the different transmission operating conditions is shown in the following table.

Where prime movers, such as gas turbines, are employed, the torque converter may be removed and a speed reduction unit provided at the gas turbine output or power train input should that be necessary. This is exemplified in the power train shown in FIGURE 2 in which the prime mover 164, which may be assumed as a gas turbine engine, has its turbine shaft 166 providing the input to a high speed two-step gear unit 168.

The gear unit 168 is contained within a transmission housing 170 and comprises a low speed gear set 172 and a high speed gear set 174 having annular sun gears 176 and 178, respectively, connected to be driven by the turbine shaft 166. The sun gear 176 meshes with a plurality of planetary pinions 180 journaled on a planet carrier 182 connected to drive a shaft 184 which is the output for this gear unit. A ring gear 186 meshes with pinions 180 and is connected to a low speed brake 188 which, when engaged, causes the carrier 182 and connected output shaft 184 to rotate in the same direction and at a reduced speed relative to the driving turbine shaft 166 to provide a low speed ratio drive.

The sun gear 178, which is larger than sun gear 176, meshes with planetary pinions 190 journaled on a planet carrier 192 which carrier is connected by the low gear set carrier 182 to the output shaft 184. A ring gear 194, which is the same size as ring gear 186, meshes with pinions 190 and is connected to a high speed brake 196. Brake 196, when engaged, holds the ring gear 194 so that the carrier 192 and connected output shaft 184 are driven by the turbine driven sun gear 178 to provide a high speed ratio drive with less speed reduction than the low speed ratio drive.

The output shaft 184 of gear unit 168 delivers power through meshing bevel gears 198 and 200 to a cross shaft 202 which serves as an input for the cross-drive transmission which, like the embodiment of FIGURE 1, comprises a three-speed forward, one-speed reverse range unit 204 and left and right steer units 206 and 208, respectively. Units 204, 206 and 208, in this arrangement, are arranged coaxially and within the transmission housing 210 to provide what may be best described as a single barrel configuration.

In this arrangement, the cross shaft 202, which runs longitudinally the length of units 204, 206 and 208, is connected at an intermediate point to drive the range unit 204 and is connected at its ends to drive the steer units 206 and 208 to provide the three input power paths. Thus, for the power path to range unit 204, the cross shaft 202 is drive connected to a spur gear 212 which meshes with

|  | Low Low Brake 162 | Low Brake 74 | Intermediat Brake 80 | High Clutch 82 | Reverse Brake 94 | Left Drive Clutch 152 | Left Steer Brake 120 | Right Drive Clutch 160 | Right Steer Brake 136 |
|---|---|---|---|---|---|---|---|---|---|
| STRAIGHT DRIVE | | | | | | | | | |
| (1) Low Low Forward | X | | | | | X | | X | |
| (2) Low Forward | | X | | | | X | | X | |
| (3) Intermediate Forward | | | X | | | X | | X | |
| (4) High Forward | | | | X | | X | | X | |
| (5) Reverse | | | | | X | X | | X | |
| (6) Neutral | | | | | | X | | X | |
| STEER | | | | | | | | | |
| (7) Drive—Brake: | | | | | | | | | |
| Right—Low Low | X | | | | | | | X | |
| Left—Low Low | X | | | | | | | | X |
| (8) Geared: | | | | | | | | | |
| Right—Low | | X | | | | | | X | X |
| Left—Low | | X | | | | | X | X | |
| Right—Intermediate | | | X | | | | | X | X |
| Left—Intermediate | | | X | | | | X | X | |
| Right—High | | | | X | | | | X | X |
| Left—High | | | | X | | | X | X | |
| Right—Reverse | | | | | X | | | X | X |
| Left—Reverse | | | | | X | X | | | X |
| (9) Pivot: | | | | | | | | | |
| Right | | | | | | | | X | X |
| Left | | | | | | | X | X | |

The power train shown in FIGURE 1 and just described employs a hydrodynamic torque converter which is well suited for prime movers, such as piston engines, since the hydraulic connection minimizes the effect of engine torsional vibration and the accompanying damper problems as, for example, exist in diesel engines.

a spur gear 214. Gear 214 is connected to drive a sleeve shaft 216 which connects directly into the range unit 204. The sleeve shaft 216 is thus connected to drive the sun gear 218 of the low planetary gear set 220 and also the sun gear 222 of the intermediate planetary gear set 224. The sun gear 218 meshes with a plurality of planetary pinions 226 journaled on output carrier 228 which is connected by a drum 230 to drive the cross shaft 232 which extends centrally through sleeve shaft 216. Ring gear 234 meshes with pinions 226 and is connected to the low brake 236 which, when engaged, provides the low ratio drive to the drum 230 and connected cross shaft 232. Ring gear 234 is also connected by the drum 238 to the intermediate carrier 240 which has journaled thereon the planetary pinions 242. Pinions 242 mesh with the sun gear 222 and also the ring gear 244, which ring gear when held by the intermediate brake 246 provides the intermediate ratio drive to the drum 230 and connected cross shaft 232. The high clutch 248, when engaged, locks up the low gear set 220 to provide direct drive between the shaft 216 and the drum 230 and connected cross shaft 232.

The reverse planetary gear set 250 is located between the right steer unit 208 and the input gear 214 for shaft 216 and has its annular sun gear 252 driven by shaft 216 and meshing with planetary pinions 254 journaled on a planet carrier 256. Carrier 256 is held when the reverse brake 258 is engaged so that the ring gear 260, which meshes with pinions 254, drives the cross shaft 232 and connected drum 230 in reverse through a drum 261 to provide the reverse ratio drive.

The left steer unit 206 and the right steer unit 208 have their left and right, equal ratio planetary gear sets 262 and 264, respectively, connected for the one input from the range unit 204, the left steer ring gear 266 being connected to drum 230 and the right steer ring gear 268 being connected by the drum 261 to cross shaft 232. In the left steer gear set, the planetary pinions 270 meshing with ring gear 266 are journaled on the output carrier 272 connected to drive the left output shaft 274. Pinions 270 also mesh with the sun gear 276 which may be grounded through the sleeve shaft 277 surrounding shaft 274 by engagement of the left steer brake 278. The outboard located left vehicle brake 279, when engaged, brakes the left output shaft 274.

In the right steer gear set 264, the ring gear 268 meshes with the pinions 280 journaled on the right output carrier 282 which is connected to drive the right output shaft 284. The pinions 280 in turn mesh with the sun gear 286 which is grounded through the sleeve shaft 287 surrounding shaft 284 when the right steer brake 288 is engaged. The outboard located right vehicle brake 289, when engaged, brakes the right output shaft 284.

The low low brake 290 in this embodiment is located adjacent the left steer unit 206 and low gear set 220 and, when engaged, brakes the drum 230 and connected steer ring gear 266 and 268.

For the other power paths to the steer gear sets which are provided by equal speed ratio spur gear trains, the cross-drive input shaft 202 is connected at its left end to spur gear 291 which meshes with spur gear 292 connected to drive sleeve shaft 294. Shaft 294 is journaled on the output shaft 274 and is connected by the engagement of the left drive clutch 296 to drive the left steer sun gear 276 forwardly. Shaft 202 at its right end is connected in like manner to spur gear 298 which meshes with spur gear 300 connected to drive sleeve shaft 302. Shaft 302 is received on right output shaft 284 and is connected to drive the right steer sun gear 286 forwardly when the right drive clutch 304 is engaged.

The embodiment of the single barrel cross-drive transmission shown in FIGURE 2 provides four forward drives, one reverse drive, drive-brake steering, geared steering and pivot steering like the FIGURE 1 embodiment but for two different input speeds for gas turbine application as provided by the high speed two-step gear unit 168 at the power train input. The preferred sequential operation of the clutches and brakes of the FIGURE 2 single barrel cross-drive transmission is the same as that of the FIGURE 1 double barrel embodiment previously described.

The arrangement of prime mover 164 and gear unit 168 as shown in FIGURE 2 provides what may be best described as a T drive, the prime mover and high speed gear unit being located longitudinally of the vehicle and the cross-drive transmission being located transversely of the vehicle. For applications where it is desired to provide a transverse drive input to the power train, the prime mover and the high speed gear unit may also be arranged transversely of the vehicle as illustrated in FIGURE 3. In FIGURE 3, like reference numerals are employed for identifying the corresponding parts shown in FIGURE 2 and previously described but with the numerals appearing in FIGURE 3 being primed. In the transverse input drive arrangement the high speed gear unit output shaft 184', which shaft is powered by the prime mover 164', is connected to drive a spur gear 306. Gear 306 meshes with a reverse idler spur gear 308 which in turn meshes with another spur gear 310. Spur gear 310 is drive connected to a transversely extending power transfer shaft 312 which shaft is connected to drive a spur gear 314. Gear 314 meshes with the gear 291' on the cross-drive input shaft 202' to complete the proper directional drive to the cross-drive transmission whose remaining parts are shown in FIGURE 2 and therefore are not reshown in FIGURE 3.

In some vehicle applications, particularly ordnance vehicle applications, it is also desirable to provide a plurality of gear ranges and types of steer in reverse to enable greater vehicle maneuverability. For example, it may be desirable to make available the same gear ranges and steering characteristics in both forward and reverse. This may best be described as providing full reversing capabilities as compared with the embodiments thus far described which provide a single reverse ratio drive.

Full reversing capabilities may be accomplished in our cross-drive transmission by removing the reverse planetary gear set from the power train and adding forward-reverse drives, as for example, in the FIGURE 2 embodiment, after the torque converter but before the inputs to the range unit and steer units. To illustrate, reference is made to the embodiment shown in FIGURE 4 in which the power train arrangement has the prime mover 316, which may be assumed as being a diesel engine, for example, extending transverse to the vehicle. The prime mover output shaft 318 is connected to drive the pump housing 320 of the three element torque converter 322, the converter also being located transversely of the vehicle. The pump housing 320 carries the pump blading 324 which pumps fluid to the turbine blading 326 from which fluid is returned by the stator blading 328 to the pump. The stator blading 328 is provided with the one-way brake 330 which has its reaction member suitably grounded and the turbine blading 326 is connected to drive the turbine or converter output shaft 332 which may also be driven directly by the prime mover output shaft 318 on engagement of the converter lockup clutch 334.

The converter delivers power through a power transfer spur gear train to the rotatably mounted clutch drum 336 of a forward reverse clutch unit 338, the gear train comprising a spur gear 340 driven by the converter output shaft 332 which gear meshes with a reverse idler spur gear 342. Gear 342 in turn meshes with a spur gear 344 which is connected to drive a clutch unit input shaft 346 which shaft in turn is connected to drive the drum 336.

The clutch unit 338 is operable to provide either a forward or reverse drive to the input cross shaft 348 for the cross-drive transmission. For forward input drive, a forward clutch 350 is engaged to connect the drum 336 to a spur gear 352 which meshes with a spur gear 354 connected to drive the cross-drive input shaft 348. A reverse clutch 356, when engaged, connects the drum 336 to an annular spur gear 358 through which shaft 346 extends. Gear 358 meshes with a reverse idler spur gear 360 which in turn meshes with a spur gear 362 connected to the left end of cross shaft 348.

The cross-drive transmission further comprises the left steer unit 364, the right steer unit 366 and the three-speed range unit 368, all coaxially located in housing 369. The input to the three-speed unit 368 is via a spur gear 370 connected to cross shaft 348 which gear meshes with an annular spur gear 372 connected to drive a sleeve shaft 374. Shaft 374 in turn drives the sun gear 376 of the low ratio planetary gear set 378 and the sun gear 380 of the intermediate ratio planetary gear set 382. Sun gear 376 meshes with the pinions 384 journaled on the range unit output carrier 386. The ring gear 388, which meshes with pinions 384, when held by engagement of the low brake 390, produces the low ratio drive to output carrier 386. The sun gear 380 meshes with the pinions 392 journaled on the planet carrier 394 which is connected to drive the ring gear 388 of the low gear set 378. The ring gear 396, which meshes with pinions 392, when held by engagement of the intermediate brake 398, produces the intermediate ratio drive to output carrier 386. The high clutch 400, when engaged, locks up the low gear set 378 to provide direct drive to the output carrier 386.

The range unit output carrier 386 is connected to drive the cross shaft 402 which shaft extends centrally through sleeve shaft 374 and is located intermediate the output shafts 404 and 406. The shaft 402 is connected at its left end to drive the ring gear 408 of the left steer planetary gear set 410. Ring gear 408 meshes with the pinions 412 journaled on the left output planet carrier 414 which is connected to drive output shaft 404. The outboard located left vehicle brake 415, when engaged, brakes the left output shaft 404. The left steer sun gear 416 meshes with pinions 412 and may be held through sleeve shaft 417 surrounding shaft 404 by the left steer brake 418.

Shaft 402 at its right end is connected to drive the ring gear 420 of the right steer planetary gear set 422. Ring gear 420 meshes with the pinions 424 journaled on the right output planet carrier 426 which is connected to drive the right output shaft 406. The outboard located right vehicle brake 427, when engaged, brakes the right output shaft 406. The right steer sun gear 428 meshes with pinions 424 and may be held through sleeve shaft 429 surrounding shaft 406 by engagement of the right steer brake 430.

The low low brake 431 is located between the low gear set 378 and the left steer gear set 410 and, when engaged, holds the cross shaft 402 and connected steer ring gears 408 and 420.

For the other inputs to the equal ratio steer units 364 and 366, which are equal speed ratio spur gear drives, the spur gear 362 driven by cross shaft 348 meshes with the spur gear 432 which is connected to drive the sleeve shaft 434 surrounding left output shaft 404. Shaft 434 in turn is connected to drive left steer sun gear 416 when the left drive clutch 436 is engaged. At the opposite end, cross shaft 348 is connected to drive the spur gear 438 which meshes with the spur gear 440. Gear 440 is connected to drive the sleeve shaft 442 through which the right output shaft 406 extends. Shaft 442 is in turn connected to drive the right steer sun gear 428 when the right drive clutch 444 is engaged.

The FIGURE 4 cross-drive transmission will thus provide four drive ranges of operation in either forward or reverse depending on the direction of rotation of the cross-drive input shaft 348 from which the three inputs for the cross-drive transmission are taken. For example, with the forward clutch 350 engaged, the cross shaft 348 rotates in one direction to drive the inputs to the drive clutches 436 and 444 in the forward direction and also to drive the range unit input shaft 374 in the forward direction. Like the embodiments previously described, low low forward drive is then provided by engagement of the drive clutches 436 and 444 and the low low brake 431. Low forward drive is provided by leaving the drive clutches engaged, releasing the low low brake 431 and engaging the low brake 390. Intermediate forward drive is provided by leaving the drive clutches engaged, releasing the low brake 390 and engaging the intermediate brake 398. The high forward drive is provided by leaving the driving clutches engaged, releasing the intermediate brake 398 and engaging the high clutch 400.

On the other hand, with the forward clutch 350 released and the reverse clutch 356 engaged, the cross shaft 348 is driven in the opposite direction to thus drive the inputs to drive clutches 436 and 444 in the reverse direction and also to drive the range unit input shaft 374 in the reverse direction. The same sequential brake and clutch operation, which was above described for forward drive, when now performed will thus produce four reverse drive ranges.

In the low low drive range and in either forward or reverse, clutch or drive-brake steering is available, like in the previous embodiments, by releasing the drive clutch and engaging the steer brake on the same side of the cross-drive transmission. In the higher forward and reverse drive ranges, namely, low, intermediate and high, there is again provided regenerative geared steer by releasing the drive clutch and applying the steer brake on the same side of the cross-drive transmission which operation produced drive-brake steering in low low.

In neutral, the steer sun gears 416 and 428 continue to be powered through engagement of the drive clutches 436 and 444 while the steer ring gears 408 and 420 are released, the direction of rotation of the steer sun gears being determined by whether the forward clutch 350 or reverse clutch 356 is engaged. Then, when one of the steer sun gears is held by its steer brake after its drive clutch has been released, the opposite steer sun gear drives its output shaft in the same direction, which direction can be forward or reverse, and drives the other output shaft on the transmission side of the engaged steer brake in the opposite direction to effect pivot steer. Having thus described the FIGURE 4 embodiment, it should be obvious that the tactical maneuverability of the vehicle has been greatly improved with the result that the vehicle operator has the ability to rapidly back out of a tight quarter where a turn around of the vehicle would be impractical for apparent reasons.

Another embodiment of our cross-drive transmission in which full reversing operation is available is illustrated in FIGURE 5. Again, there is provided the T configuration input to the power train with the prime mover 450 which may be assumed as being a diesel engine, for example, and the torque converter 452 arranged longitudinally of the vehicle. The prime mover output shaft 454 is connected to drive the converter pump housing 456 carrying the pump blading 458. The turbine blading 460 is connected to drive the turbine or converter output shaft 462 and the stator blading 464 is connected to the stationary converter housing by the one-way brake 466. The converter lockup clutch 468, when engaged, provides the direct drive between shafts 454 and 462.

Converter output shaft 462 is connected to drive a bevel gear 470 meshing with a second bevel gear 472 which is connected to drive a transversely arranged shaft 474. Shaft 474 provides the input to the clutch drum 476 of a forward-reverse clutch unit 478. Drum 476 in turn is connectible through forward and reverse drives to the range unit 480, left steer unit 482 and right steer unit 484.

For the forward drive, unit 478 has a forward drive clutch 486 which, when engaged, connects drum 476 to drive an annular spur gear 488 through which shaft 474 freely extends. As best shown in FIGURE 6, gear 488 meshes with an annular spur gear 490 which is connected to the input sleeve shaft 492 of range unit 480. Gear 490 in turn meshes with an annular spur gear 494 which is connected to drive the drum 495 of a drive clutch unit 496 which clutch unit relocates the steer unit drive clutches inboard in a compact package as will be described in greater detail later. Gears 488 and 494 do not mesh. Thus, there are two meshing gears in this forward drive gear train and with the forward drive clutch 486 engaged, shaft 474 drives the range unit input shaft 492 in the opposite direction, which direction is forward for this transmission.

For the reverse drive to the range unit input shaft 492, a reverse drive clutch 497 is engaged to connect from 476 to an annular spur gear 498 which meshes with an annular spur gear 500. Gear 500 is connected by the steer clutch drum 495 to the gear 494 meshing with gear 490 to complete the drive to the range unit shaft 492. Thus, connected gears 500 and 494 act as a reverse idler and cause gear 490 to rotate in the same direction as driving gear 498 so that with the reverse drive clutch 497 engaged, shaft 474 drives the range unit input shaft 492 in the same direction, which direction is reverse for this transmission.

The range unit input shaft 492 is connected to drive the sun gear 502 of the low planetary gear set 504 and the sun gear 506 of the intermediate planetary gear set 508. The sun gear 502 meshes with the pinions 510 journaled on the output planet carrier 512. The ring gear 514 meshes with the pinions 510 and is connected to the intermediate carrier 516 which may be held by the relocated low brake 518 to provide the low ratio drive in the range unit. The sun gear 506 meshes with pinions 520 journaled on the carrier 516 and the ring gear 522 meshes with pinions 520 and may be held by the intermediate brake 524 to provide the intermediate ratio drive. The high clutch 526 locks up the low gear set 504 to provide direct drive from shaft 492 to the output carrier 512.

Output carrier 512 is connected to drive cross shaft 528 which is located intermediate the left steer planetary set 530 and the right steer planetary set 532 which gear sets have equal ratios. The cross shaft 528 is connected at its left end to the left steer ring gear 534. The ring gear 534 meshes with the pinions 538 journaled on the output carrier 540 which carrier is connected to drive the left steer unit output shaft 542. The sun gear 544 meshes with pinions 538 and may be held for reaction through sleeve shaft 545 surrounding shaft 542 by engagement of the left steer brake 546.

In this embodiment the transmission is provided with an integral left final speed reduction drive planetary gear set 548 which has its sun gear 550 driven by shaft 542. Sun gear 550 meshes with pinions 552 journaled on a carrier 554 which is connected to a left final drive output shaft 556 for drive to the left track sprocket. The ring gear 558, which meshes with pinions 552, is rigidly connected to the transmission housing 559 so as to always provide reaction for this gear set. A left vehicle brake 560 is also provided which, when engaged, retards and will eventually with full engagement hold shaft 542 to brake through the reactionary final drive gear set 548, the final drive output shaft 556.

The cross shaft 528 at its right end is connected in similar manner to drive the right steer ring gear 562. The ring gear 562 meshes with pinions 566 journaled on the output carrier 568 which carrier is connected to drive the right steer unit output shaft 570. The sun gear 572 meshes with pinions 566 and may be held for reaction through sleeve shaft 573 surrounding shaft 570 by engagement of the right steer brake 574.

An integral right final speed reduction drive planetary gear set 576 having a ratio equal to its complementary left gear set 548 completes the drive from shaft 570 to a right final drive output shaft 578 and the right track sprocket has its sun gear 580 driven by shaft 570. The sun gear 580 meshes with pinions 582 journaled on an output planet carrier 584 connected to shaft 578. A ring gear 585 meshes with pinions 582 and is connected to housing 559 to continuously provide reaction for this gear set. A right vehicle brake 586, when engaged, retards and, when eventually fully engaged, holds shaft 570 to brake the right final drive output shaft 578 through the reactionary gear set 576.

The low low brake 579 is located between the left steer gear set 530 and the low gear set 504 and, when engaged, holds the cross shaft 528 and connected steer ring gears 534 and 562.

With the forward and reverse drive inputs to the range unit and connected steer units thus described, the second and equal speed ratio inputs to the steer units will now be described.

The output drum 495 of the drive clutch unit 496 is driven in the reverse direction when the forward drive clutch 486 is engaged and in the forward direction when the reverse drive clutch 497 is engaged, recognizing that during forward drive operation, the range unit input gear 490 will act as a reverse idler gear to drive drum 495 in the reverse and during reverse drive operation, the gear 498 will drive meshing gear 500 and connected drum 495 forward. Unit 496 is provided with a left drive clutch 588 for the left steer unit 482 which clutch, when engaged, connects drum 495 to drive a left half shaft 592. Shaft 592 is in turn connected to drive at its left end a spur gear 594 which gear meshes with a spur gear 596. Gear 596 is connected by sleeve shaft 545 to drive the left steer sun gear 544. Since meshing gears 594 and 596 reverse the drive direction from drum 495 to the left steer sun gear 544, the left steer sun gear is thus driven forwardly when the forward drive clutch 486 and the left drive clutch 588 are engaged and is driven in reverse when the reverse drive clutch 497 and the left drive clutch 588 are engaged.

When a right drive clutch 598 in unit 496 is engaged, the drum 495 is in similar manner connected to drive a right half shaft 600 which is connected at its right end to a spur gear 602. Gear 602 meshes with a spur gear 604 which is connected by sleeve shaft 573 to drive the right steer sun gear 572. Thus, like the left steer sun gear, the right steer sun gear 572 is driven forwardly with the same speed ratio drive as the left steer sun gear when the forward drive clutch 486 and the right drive clutch 598 are engaged and is driven in reverse when the reverse drive clutch 497 and the right drive clutch 598 are engaged.

Having thus described the cross-drive transmission of FIGURE 5, and, as it will become more apparent from the following description of operation, this cross-drive transmission also offers full reversing operation in that it provides four reverse speed ranges of operation as well as four forward speed ranges of operation and, in addition, provides drive-brake steering, geared steering and pivot steering in both forward and reverse.

First forward drive range operation is provided by engaging the forward drive clutch 486, the left and right drive clutches 588 and 598 and the low low brake 579. With both drive clutches 588 and 598 engaged, all power is then delivered through the drive clutch unit half shafts 592 and 600 to the steer sun gears 544 and 572, respectively. Since the steer ring gears 534 and 562 are grounded by the engagement of the low low brake 579, the steer gear sets 530 and 532 again act as low low gear sets to drive their respective output shafts 542 and 570, respectively, which shafts 542 and 570 then drive through the left and right final drive gear sets 548 and 576, the final drive left and right output shafts 556 and 578, respectively. Gear sets 548 and 576 thus produce the maximum torque in the power train at the final drive output shafts only to reduce the torque load for the remainder of the power train. A clutch or drive-brake steer is accomplished in this lowest forward drive range by releasing one of the steer sun gears through disengagement of its drive clutch and then grounding this released steer sun gear with its steer brake. Then, since both the sun gear and ring gear of one steer gear set are grounded and only the ring gear is grounded in the other steer gear set, the drive-brake steer is obtained and the radius of this steer can be varied through slipping of the engaged steer brake.

The three higher forward operating ranges are obtained by turning the two steer ring gears 534 and 562 forward at different speeds as dictated by the range unit 480 which is selectively conditionable to provide the low, intermediate and high ratio drive. In these three higher operating ranges, the steer units 482 and 484 then act as power combining sets receiving power from the range unit 480 through their ring gears and from the drive clutch unit half shafts through their respective sun gears. A geared steer is accomplished in these higher ranges by releasing the drive clutch and applying the associated steer brake on one transmission side. This again produces a regenerative geared steer since the steer ring gears can transmit power from one side to the other via the cross shaft 528. The radius of turn will depend upon the relative speed of the sun and ring gears in the steer sets in each drive range and will vary from moderate geared turns in the highest speed ranges for minimum steer to sharp geared turns in the lowest speed ranges for maximum maneuverability.

For operation in reverse and in the first drive range, the reverse drive clutch 497 is engaged, the left and right drive clutches 588 and 598 are engaged and the low low brake 579 is engaged, all other drive establishing devices being disengaged. Since the steer sun gears 544 and 572 are now turning in the reverse direction, a reversal in vehicle motion results and the first reverse drive range is obtained. The three higher drive ranges in reverse are obtained by disengagement of the low low ratio drive and selection of low, intermediate and high, respectively, in the range unit 480 which now has reverse drive input. Steers in the reverse drive ranges are obtained in the same manner as during forward drive operation.

In neutral, the steer sun gears 544 and 572 continue to be powered through engagement of the drive clutches 588 and 598 with either the forward drive clutch 486 or the reverse drive clutch 497 engaged, but the steer ring gears 534 and 562 are released and therefore turn in the opposite direction under no load. Then, when one of the steer sun gears is released by disengaging its associated drive clutch and then held by its associated steer brake, the opposite steer sun gear drives its steer unit output shaft in the same direction and drives the other steer unit output shaft, which is on the side of the engaged steer brake, in the opposite direction to effect pivot steer.

Another embodiment of our cross drive transmission is illustrated in FIGURE 7, in which a spur gear differential is provided to connect the steer units to provide brake differential, differential and pivot steering operation. Again, there is provided the T configuration input to the power train with the prime mover 650 which may be assumed as being a diesel engine, for example, and the torque converter 652 arranged longitudinally of the vehicle. The prime mover output shaft 654 is connected to drive the turbine or converter output shaft 662 and the pump blading 658. The turbine blading 660 is connected to drive the turbine or convrter output shaft 662 and the stator blading 664 is connected to the stationary converter housing by the one-way brake 666. The converter lockup clutch 668, when engaged, provides the direct drive between shafts 654 and 662.

Converter output shaft 662 is connected to drive the bevel gear 670 which meshes with a second bevel gear 672 of the spur gear differential unit 673. The unit 673 comprises a carrier 674 driven by gear 672 and rotatably supporting a first set of planetary pinions 675 and a second set of planetary pinions 676 which planet sets are in mesh. A sun gear 677 meshes with the pinions 675 and is connected to drive a left half-shaft 678 to provide an input to the left steer unit 680. Similarly, a sun gear 681 meshes with the pinions 676 and is connected to drive a right half-shaft 682 to provide an input for the right steer unit 684. The remaining one of the three input power paths for the cross drive is provided by the annular spur gear 686 which is rigidly secured to the differential carrier 674 and meshes with a spur gear 688, the latter gear being connected to drive a sleeve shaft 690 which connects directly into the three-spaced forward, one-speed reverse range unit 692.

Range unit input shaft 690 is connected to drive the sun gear 694 of the low planetary gear set 696 and the sun gear 698 of the intermediate planetary gear set 700. The sun gear 694 meshes with pinions 702 journaled on the output planet carrier 704. The ring gear 706 meshes with the pinions 702 and is connected to the intermediate carrier 708 which may be held by the low brake 710 to provide the low drive in the range unit. The sun gear 698 meshes with pinions 712 journaled on the carrier 708 and the ring gear 714 meshes with pinions 712 and may be held by the intermediate brake 716 to provide the intermediate ratio drive. The high clutch 718 locks up the low gear set 696 to provide direct drive from shaft 690 to the output carrier 704.

The reverse planetary gear set 719 is located between the right steer unit 684 and the gear 688 and has its annular sun gear 721 driven by shaft 690 and meshing with planetary pinions 723 journaled on the planet carrier 725. Carrier is held when the reverse brake 727 is engaged so that the ring gear 729, which meshes with pinions 723, drives the drum 731 to provide the reverse ratio drive.

Output carrier 704 is connected by drum 705 to drive the cross shaft 720. This shaft passes through sleeve shaft 690 and is located intermediate the left steer planetary set 722 and the right steer planetary set 724 and is also connected to be driven by the drum 731 and connected reverse ring gear 729.

The range unit 692 completes the one input to the left and right equal ratio steer units with the left steer ring gear 726 being connected to drum 705 and the right steer ring gear 728 being connected to drum 731. In the left steer gear set the planetary pinions 730 meshing with ring gear 726 are journaled on the output carrier 732 connected to drive the left output shaft 734. Pinions 730 also mesh with the sun gear 736 which may be grounded through the sleeve shaft 738 surrounding shaft 734 by engagement of the left steer brake 740. The outboard located left vehicle brake 742, when engaged, brakes the left output shaft 734.

In the right steer gear set 724, the ring gear 728 meshes with the pinions 744 journaled on the right output carrier 746 which is connected to drive the right output shaft 748. The pinions 744 in turn mesh with the sun gear 750 which is grounded through the sleeve shaft 752 surrounding shaft 748 when the right steer brake 754 is engaged. The outboard located right vehicle brake 756, when engaged, brakes the right output shaft 748.

The low low brake 758 is again located adjacent the left steer unit 680 and low gear set 696 and, when engaged, brakes the drum 705 and connected steer ring gears 726 and 728.

For the other power paths to the steer units, the left half-shaft 678 of the differential unit 673 is connected at its left end to the spur gear 760 which meshes with the spur gear 762 connected to drive sleeve shaft 738 and connected left steer sun gear 736. Similarly, the right end of the right half-shaft 682 is connected to the spur gear 764 which meshes with the spur gear 766 connected to drive the sleeve shaft 752 and connected right steer sun gear 750.

The embodiment of the single barrel cross drive transmission shown in FIGURE 7 provides four forward drives, one reverse drive, brake-differential steering, differential steering and pivot steering. The preferred sequence of operation is described in the following illustrative operational summary.

In the first or low low forward drive range, the low low brake 758 is engaged and all other drive establishing devices are disengaged. Under these conditions, the range unit 692 is thus conditioned so as not to transmit power therethrough to the steer ring gears 726 and 729 which are being held by the engaged low low brake. Converter output is thus delivered by the differential unit 673 and by the pair of equal ratio spur gear trains 760–762 and 764–766 to drive the steer sun gear 736 and 750 forwardly at the same speed. Since the steer ring gears 726 and 729 are both held by the low low brake 758, the steer gear sets 722 and 724 act as torque multiplying and low ratio gear sets for the first forward drive.

In this low low forward drive range, brake-differential steering is available by either engaging the right steer brake 754 which produces a right turn or engaging the left steer brake 740 which produces a left turn. With one of the steer brakes engaged, the associated steer gear set acts to brake its connected output shaft since both its sun gear and ring gear are being braked. Under these conditions, the differential unit 673, since it has one of its half-shafts braked, speeds up its unbraked half-shaft by the same amount the speed of the opposite half-shaft is diminished and in consequence the other steer gear set, which has its steer brake released, proportionally increases the speed of its connected output shaft whereby the brake-differential steering is effected. Thus, when one output shaft is held stationary, the other output shaft will double its speed in the forward direction to produce the tightest turn in low low with turns of radii larger than the minimum radius being accomplished by slipping the steer brake under the load.

The three higher forward drive ranges are provided by split torque drive to the steer units which split torque drive apportions the torque between the steer unit input power paths to reduce their torque loads. The steer sun gears 736 and 750 continue to be driven forwardly through the divided power path by the differential unit 673 while at the same time the steer ring gears 726 and 728 are driven forwardly at different speeds through their common input power path which has the range unit 692.

For example, in the next highest forward drive range which is low forward, only the low brake 710 is engaged. Thus, the steer sun gears 736 and 750 continue to be driven forwardly by the converter driven differential unit 673 and the steer ring gears 726 and 728 are also driven forwardly by the range unit low ratio drive. The forward drive contributions of the steer sun and ring gears are then combined to produce the low forward drive. The third or intermediate forward drive range is obtained by engaging only the intermediate brake 716 with all other drive establishing devices being released to provide a higher speed drive to steer ring gears 726 and 728. The fourth and highest forward drive range is provided by engaging the high clutch 718, all other drive establishing devices being disengaged, to provide the range unit direct drive for providing the ring steer gear 726 and 728 forwardly at the highest speed ratio available.

In the three highest forward drive ranges, differential steering is available by applying one of the steer brakes to eliminate the forward drive contribution of one of the steer sun gears and to double the forward drive contribution of the other steer sun gear by the differential action of the differential unit 673. Thus, it will be observed that in the three highest forward drive ranges, steering is accomplished by the downshifting of one steer gear set by a braking operation which through a differential gear unit upshifts the other steer gear set by increasing the forward drive contribution of its unbraked output by the amount the speed of the braked output is diminished. For example, in the low forward drive range a right-low differential steer is accomplished by engaging the right steer brake 754. Thus, the forward drive contribution of the right steer sun gear 750 has been eliminated and only the forward drive contribution of the right steer ring gear 728 remains. Since the right half-shaft 682 is held on engagement of the right steer brake 754, the differential gear unit 673 causes the left half-shaft 678 to double its speed and in consequence the forward drive contribution of the left steer sun gear 736 is doubled while the same forward drive contribution of the left steer ring gear 726 remains. Thus, the speed of the left output shaft 734 is increased by the same amount the speed of the right output shaft 748 is diminished to produce the differential steer. Similarly, a left turn differential steer in the low forward drive range is accomplished by engaging the left steer brake 740. In like manner, right turn differential steer in the intermediate and high forward drive ranges is accomplished by engaging the right steer brake 754 and left turn differential steer is obtained by engaging the left steer brake 740.

In neutral, all drives through the range unit 692 are disengaged and the steer ring gears 726 and 728 are free to rotate while the steer sun gears 736 and 750 remain powered by the differential unit 673. Then, when one of the steer sun gears is held by engagement of its steer brake, the opposite steer sun gear, which is not held but driven by the differential steer unit 673, drives its associated output shaft forward. This driven steer sun gear also drives the opposite output shaft, which output shaft is on the side of the engaged steer brake, backwards through the power path provided by the connected steer ring gears. This operation provides a pivot steer. Thus, with the transmission in neutral, a right pivot steer is obtained when the right steer brake 754 is engaged. Alternatively, a left pivot steer is obtained when left steer brake 740 is engaged.

The reverse drive range also has split torque drive and is provided by driving the steer sun gears forwardly by the differential unit 673 and engaging the reverse brake 727 to drive the steer ring gears in reverse. This combined sun and ring gear action drives the output shafts 734 and 748 in reverse and again maximum torque is at the output shafts only. Differential steering is also available in the reverse drive range by engaging one of the steer brakes depending upon which direction of turn is desired. Engagement of one of the steer brakes has the effect of eliminating the forward drive contribution of one of the steer sun gears and doubling the forward drive contribution of the other steer sun gear recognizing that in the steer gear set which has its forward sun gear contribution eliminated, the associated output shaft is speeded up in reverse by the reverse rotation of the associated steer ring gear. At the same time the speed of the opposite output shaft is diminished a corresponding amount since the forward drive contribution of its associated steer sun gear has been doubled while the speed of the associated steer ring gear in reverse has remained the same.

Thus, it will be observed that our cross-drive transmission offers several important structural advantages which contribute to minimum size and weight while keeping the power path construction simple but yet capable of a wide range of operation. For example, power is always divided with maximum torque being limited to the final output shafts, thus permitting minimum space and weight without sacrifice of reliability by overstressing or overspeeding the gear components through reduction in gear component load stresses by the split torque drives. Furthermore, a plurality of different types of steer may be accomplished by the same one or two friction engaging devices for each steer unit, regardless of gear range. This materially simplifies the control system which must control the engagement and disengagement of the proper friction engaging devices and also the supply of coolant to the devices being engaged.

The above-described preferred embodiments are illustrative of the invention which may be modified within the scope of the appended claims.

We claim:

1. In a cross-drive transmission the combination of
   (a) an input shaft, a cross shaft, a right and a left output shaft,
   (b) a right and a left differential drive gear unit operatively connecting respectively the right and left end of said cross shaft to each said right and left output shaft, said right and left differential gear unit having respectively a right and a left sun gear, a right and a left ring gear and a right and a left carrier having pinions meshing with said right sun and ring gear and said left sun and ring gear respectively, said right and left ring gear being connected to said cross shaft, said right and left carrier being connected to said right and left output shaft respectively, a right and a left steer brake for holding said right and left sun gear respectively, a low low brake for holding said cross shaft, (c) drive transmitting means for connecting said input shaft to drive said cross shaft including a multiple speed ratio drive gear unit selectively conditionable to establish a low, intermediate and high speed ratio drive and selectively conditionable drive means located between said input shaft and said multiple speed ratio drive gear unit for selectively changing the direction of drive whereby said low, intermediate and high speed ratio drives are available to drive said cross shaft and connected right and left ring gears in a forward direction and a reverse direction, (d) a right and a left drive means for connecting respectively the right and left sun gear through said selectively conditionable drive means to said input shaft whereby said input shaft is available to selectively drive said right and left sun gear in the forward and reverse directions, said right and left drive means including a selectively operable right drive clutch and a selectively operable left drive clutch respectively, (e) the combination of said right and left differential drive gear units and said multiple speed ratio drive gear unit being operable with their forward drive input and their reverse drive input to provide the same speed ratio and directional drive to said right and left output shaft in one drive range when said low low brake and both of said drive clutches are engaged and in a succession of progressively higher drive ranges when both of said drive clutches are engaged and said low, intermediate and high speed ratio drives are selectively established in that order, (f) and said right and left differential drive gear unit being operable to provide steering in all of said drive ranges and in a neutral condition with both of said drive clutches engaged when the drive clutch for one of said differential drive gear units is disengaged to release the associated sun gear and the released sun gear is held by the associated steer brake.

2. The cross-drive transmission set forth in claim 1 and said multiple speed ratio drive gear unit being concentrically located about said cross shaft and said selectively conditionable drive means including a direction unreversing gear train operated by a forward drive clutch to provide the forward direction drive and a direction reversing gear train operated by a reverse drive clutch to provide the reverse direction drive.

3. The cross-drive transmission set forth in claim 1 and said drive clutches being concentrically located about their associated output shafts.

4. The cross-drive transmission set forth in claim 1 and said drive clutches being located inboard of said differential drive gear units and concentric about an axis offset from and parallel to said output shafts.

5. The cross-drive transmission set forth in claim 1 and a right and a left final drive reduction planetary gear unit driven by said right and left output shaft respectively, a right and a left brake inboard of said right and left final drive gear unit respectively for holding said right and left output shaft respectively.

6. In a cross-drive transmission the combination of (a) an input shaft, a cross shaft, a right and a left output shaft, (b) a right and a left differential drive gear unit operatively connecting respectively the right and left end of said cross shaft to each said right and left output shaft, said right and left differential gear unit having respectively a right and a left sun gear, a right and a left ring gear and a right and a left carrier having pinions meshing with said right sun and ring gear and said left sun and ring gear respectively, said right and left ring gear being connected to said cross shaft, said right and left carrier being connected to said right and left output shaft respectively, a right and a left steer brake for holding said right and left sun gear respectively, a low low brake for holding said cross shaft, (c) drive transmitting means for connecting said input shaft to said cross shaft including a multiple speed ratio drive gear unit, said multiple ratio drive gear unit including a first and a second planetary gear set having respectively a first and a second sun gear, a first and a second ring gear and a first and a second carrier having pinions meshing with said first sun and ring gear and said second sun and ring gear respectively, said first and second sun gear being operatively connected to said input shaft, said first carrier being operatively connected to said cross shaft, a low brake to hold said first ring gear to provide a forward low speed ratio drive, said second carrier being connected to said first ring gear, an intermediate brake to hold said second ring gear to provide a forward intermediate speed ratio drive and a high clutch to lock up said first gear set to provide a forward high speed ratio drive, a third planetary gear set having a third sun gear, a third ring gear and a third carrier having pinions meshing with said third sun and ring gear, said third sun gear being operatively connected to said input shaft, said third ring gear being connected to said cross shaft, a reverse brake to hold said third carrier to provide a reverse low speed ratio drive, (d) a right and a left drive means for connecting respectively the right and left sun gear to said input shaft for forward drive, said right and left drive means including a selectively operable right drive clutch and a selectively operable left drive clutch respectively, (e) the combination of said right and left differential drive gear unit and said multiple speed ratio drive gear unit being operable to provide the same speed ratio and directional drive to said right and left output shaft in a forward low low drive range when only said low low brake and said right and left drive clutch are engaged, in a forward low drive range when only said low brake and said right and left drive clutch are engaged, in a forward intermediate drive range when only said intermediate brake and said right and left drive clutch are engaged, in a forward high drive range when only said high clutch and said right and left drive clutch are engaged, and in a reverse low drive range when only said reverse brake and said right and left drive clutch are engaged, (f) and said right and left differential drive gear unit being operable to drive one of said output shafts in one direction while holding the other of said output shafts to provide drive brake steering in said forward low low drive range when one of said drive clutches is disengaged to release the associated sun gear and the released sun gear is held by the associated steer brake, to drive said output shafts in the same direction at different speeds to provide regenerative geared steering in said forward low, intermediate and high drive ranges and said reverse low drive range when one of said drive clutches is disengaged to release the associated sun gear and the released sun gear is held by the associated steer brake and to drive said output shafts in opposite directions at the same speed to provide pivot steering when only the drive clutch for one of said differential drive gear units is engaged and the steer brake for the other of said differential drive gear units is engaged.

7. In a cross-drive transmission the combination of
  (a) an input shaft, a cross-drive input shaft, a cross shaft, a right and a left output shaft,
  (b) a right and a left differential drive gear unit operatively connecting respectively the right and left end of said cross shaft to each said right and left output shaft, said right and left differential gear unit having respectively a right and a left sun gear, a right and a left ring gear and a right and a left carrier having pinions meshing with said right sun and ring gear and said left sun and ring gear respectively, said right and left ring gear being connected to said cross shaft, said right and left carrier being connected to said right and left output shaft respectively, a right and a left steer brake for holding said right and left sun gear respectively, a low low brake for holding said cross shaft,
  (c) drive transmitting means for operatively connecting said cross-drive input shaft to said cross shaft including a multiple speed ratio drive gear unit, said multiple ratio drive gear unit including a first and a second planetary gear set having respectively a first and a second sun gear, a first and a second ring gear and a first and a second carrier having pinions meshing with said first sun and ring gear and said second sun and ring gear respectively, said first and second sun gear being operatively connected to said input shaft, said first carrier being operatively connected to said cross shaft, a low brake to hold said first ring gear to provide a low speed ratio drive, said second carrier being connected to said first ring gear, an intermediate brake to hold said second ring gear to provide an intermediate speed ratio drive and a high clutch to lock up said first gear set to provide a high speed ratio drive,
  (d) a right and a left drive means for connecting respectively the right and left sun gears to said cross-drive input shaft, said right and left drive means including a selectively operable right drive clutch and a selectively operable left drive clutch respectively,
  (e) forward-reverse drive means for selectively connecting said input shaft to drive said cross-drive input shaft in opposite directions,
  (f) the combination of said right and left differential drive gear unit and said multiple speed ratio drive gear unit being operable with said cross-drive shaft being driven in either direction to provide the same speed ratio and directional drive to said right and left output shaft in a low low drive range when said low low brake and said right and left drive clutch are engaged, in a low drive range when said low brake and said right and left drive clutch are engaged, in an intermediate drive range when said intermediate brake and said right and left drive clutch are engaged, and in a high drive range when said high clutch and said right and left drive clutch are engaged,
  (g) and said right and left differential drive gear unit being operable to drive one of said output shafts in one direction while holding the other of said output shafts to provide drive brake steering in said low low drive range when one of said drive clutches is disengaged to release the associated sun gear and the released sun gear is held by the associated steer brake, to drive said output shafts in the same direction at different speeds to provide regenerative geared steering in said low, intermediate and high drive ranges when one of said drive clutches is disengaged to release the associated sun gear and the released sun gear is held by the associated steer brake and to drive said output shafts in opposite directions at the same speed to provide pivot steering when only the drive clutch for one of said differential drive gear units is engaged and the steer brake for the other of said differential drive gear units is engaged.

8. In a cross-drive transmission, the combination of
  (a) an input shaft, a cross shaft, a right and a left output shaft,
  (b) a right and a left differential drive gear unit operatively connecting respectively the right and left end of said cross shaft to said right and left output shaft, said right and left differential gear unit having respectively a right and a left sun gear, a right and a left ring gear and a right and a left carrier having pinions meshing with said right sun and ring gear and said left sun and ring gear respectively, said right and left ring gear being connected to said cross shaft, said right and left carrier being connected to said right and left output shaft respectively, a right and a left steer brake for holding said right and left sun gear respectively, a low low brake for holding said cross shaft,
  (c) drive transmitting means for connecting said input shaft to said cross shaft including a multiple speed ratio drive gear unit, said multiple ratio drive gear unit including a first, a second and a third planetary gear set having respectively a first, a second and a third sun gear, a first, a second and a third ring gear and a first, a second and a third carrier having pinions meshing with said first, second and third sun and ring gear respectively, said first, second and third sun gear being operatively connected to said input shaft, said first carrier being connected to said cross shaft, a low brake to hold said first ring gear to provide a forward low speed ratio drive, said second carrier being connected to said first ring gear, an intermediate brake to hold said second ring gear to provide a forward intermediate speed ratio drive, a high clutch to lock up said first gear set to provide a forward high speed ratio and direct drive, said third ring gear being connected to said cross shaft, a reverse brake to hold said third carrier to provide a reverse low speed ratio drive,
  (d) drive means for connecting said input shaft to said right and left sun gear for forward drive, said drive means including a differential gear unit having a differential carrier operatively connected to said input shaft, a first set of planetary pinions journaled on said differential carrier, a sun gear meshing with said first set of planetary pinions and connected to drive said left sun gear, and be braked by said left steer brake, a second set of planetary pinions journaled on said differential carrier and meshing with said first set of planetary pinions, a sun gear meshing with said second set of planetary pinions and connected to drive said right sun gear and be braked by said right steer brake,
  (e) the combination of said right and left differential drive gear unit, said differential gear unit and said multispeed ratio drive gear unit being operable to provide the same speed ratio and directional drive to said right and left output shaft in a low low drive range when only said low low brake is engaged, in a forward low drive range when only said low brake is engaged, in a forward intermediate drive range when only said intermediate brake is engaged, in a forward high drive range when only said high clutch is engaged, and in a reverse low drive range when only said reverse brake is engaged,
  (f) and said right and left differential drive gear unit and said differential gear unit being operable to provide brake-differential steering in said low low forward drive range when one of said steer brakes is engaged, to provide differential steering in said low, intermediate and high forward drive ranges when one of said steer brakes is engaged, to provide pivot steering when no speed ratio drives are established in said multiple speed ratio drive unit and one of said steer brakes is engaged and to provide differential steering in said reverse low drive range when one of said steer brakes is engaged.

9. In a cross-drive transmission the combination of
(a) input means, a pair of output means,
(b) a pair of speed differential planetary gear units for driving said output means, each of said speed differential planetary gear units having a pair of input gear means and an output gear means which output gear means is operatively connected to the associated output means,
(c) a pair of first drive means operable to selectively simultaneously or alternatively operatively connect said input means and one of said input gear means of said speed differential planetary gear units, said first drive means being selectively operable to provide a fixed forward drive ratio and a fixed reverse drive ratio,
(d) a pair of brakes for holding said one input gear means of said speed differential gear units,
(e) second drive means including a variable speed ratio planetary gear unit operatively connecting said input means to the other of said input gear means of both of said speed differential gear units, said second drive means being selectively operable to provide a plurality of different forward and reverse drive ratios,
(f) and a brake for holding both of said other input gear means.

References Cited

UNITED STATES PATENTS

| | | | |
|---|---|---|---|
| 1,991,094 | 2/1935 | Higley | 74—720.5 X |
| 2,336,912 | 12/1943 | Zimmermann | 74—720.5 X |
| 2,377,354 | 6/1945 | Merritt | 74—720.5 X |
| 2,525,190 | 10/1950 | Toot et al. | |
| 2,689,488 | 9/1954 | Storer et al. | 74—732 X |
| 2,689,489 | 9/1954 | Storer et al. | 74—732 X |
| 2,874,591 | 2/1959 | Thoma | 74—720.5 |
| 2,930,257 | 3/1960 | Christenson | 74—720.5 |
| 2,950,633 | 8/1960 | Goodrich | 74—720.5 |
| 2,950,634 | 8/1960 | Clark et al. | 74—720.5 X |

FOREIGN PATENTS

| | | |
|---|---|---|
| 79,913 | 7/1950 | Czechoslovakia. |
| 1,154,724 | 9/1963 | Germany. |
| 1,180,256 | 10/1964 | Germany. |
| 799,532 | 8/1958 | Great Britain. |
| 933,125 | 8/1963 | Great Britain. |
| 607,808 | 4/1958 | Italy. |

DONLEY J. STOCKING, *Primary Examiner.*

ARTHUR T. McKEON, *Examiner.*

J. R. BENEFIEL, *Assistant Examiner.*

UNITED STATES PATENT OFFICE
CERTIFICATE OF CORRECTION

Patent No. 3,377,885            April 16, 1968

Robert M. Tuck et al.

It is certified that error appears in the above identified patent and that said Letters Patent are hereby corrected as shown below:

Column 8, line 15, "134" should read -- 124 --. Column 15, line 5, cancel "the", first occurrence; line 6, "from" should read -- drum --. Column 17, lines 45 and 46, after "differential" insert -- unit --; line 53, cancel "turbine or converter output shaft 662 and" and insert -- converter pump housing 556 carrying --; line 55, "convrter" should read -- converter --. Column 18, line 2, "spaced" should read -- speed --; line 22, after "Carrier" insert -- 725 --.

Signed and sealed this 9th day of September 1969.

(SEAL)
Attest:

Edward M. Fletcher, Jr.           WILLIAM E. SCHUYLER, JR.
Attesting Officer                Commissioner of Patents